(12) United States Patent
Tomoiu

(10) Patent No.: US 9,454,955 B1
(45) Date of Patent: *Sep. 27, 2016

(54) THERMO-ACOUSTIC REACTOR WITH NON-THERMAL ENERGY ABSORPTION IN INERT MEDIUM

(71) Applicant: Constantin Tomoiu, Bridgeport, CT (US)

(72) Inventor: Constantin Tomoiu, Bridgeport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/689,146

(22) Filed: Apr. 17, 2015

(51) Int. Cl.
*G01S 1/72* (2006.01)
*G10K 15/04* (2006.01)

(52) U.S. Cl.
CPC .................. *G10K 15/043* (2013.01)

(58) Field of Classification Search
CPC ........................................ G01S 1/72
USPC ........................................ 181/142
See application file for complete search history.

(56) References Cited

U.S. PATENT DOCUMENTS

| | | | |
|---|---|---|---|
| 3,997,021 A | 12/1976 | Chelminski | 181/106 |
| 4,100,991 A | 7/1978 | Airhart | 181/117 |
| 4,408,676 A | 10/1983 | McCoy | 181/113 |
| 5,229,977 A | 7/1993 | Owen | 367/145 |
| 5,233,570 A | 8/1993 | Donskoy | 367/142 |
| 5,237,964 A | 8/1993 | Tomoiu | 123/25 C |
| 6,776,256 B2 | 8/2004 | Kostyuchenko et al. | 181/116 |
| 6,804,963 B1 | 10/2004 | Tomoiu | 60/670 |
| 7,882,926 B2 * | 2/2011 | Fullerton | 181/117 |
| 8,302,730 B2 | 11/2012 | Fullerton | 181/101 |
| 8,752,665 B1 | 6/2014 | Tomoiu | 181/142 |
| 9,116,252 B2 * | 8/2015 | Fullerton et al. | |

* cited by examiner

*Primary Examiner* — Forrest M Phillips
(74) *Attorney, Agent, or Firm* — Fattibene and Fattibene LL; Paul A. Fattibene

(57) ABSTRACT

An air, fuel, and inert fluid or liquid water mixture is injected into a resonance chamber forming micro-packets. The air and fuel mixture in the micro-packets form micro-explosions in a combustion chamber where acoustic and electromagnetic energy are absorbed by the inert fluid instead of thermal energy. A standing wave is created in the central resonance chamber by the micro-explosions. Interfering waves are in phase increasing energy in the air, fuel and water mixture. Acoustic energy is transferred from the hot combustion gases to the colder inert fluid or water. A thermal equilibrium is reached without substantial energy transfer from the hot body to the cold body. Efficient combustion is achieved with reduced carbon emissions. The heat generated from the combustion may be used to produce work by any conventional device, such as a steam engine or turbine or generate heat for a building.

10 Claims, 1 Drawing Sheet

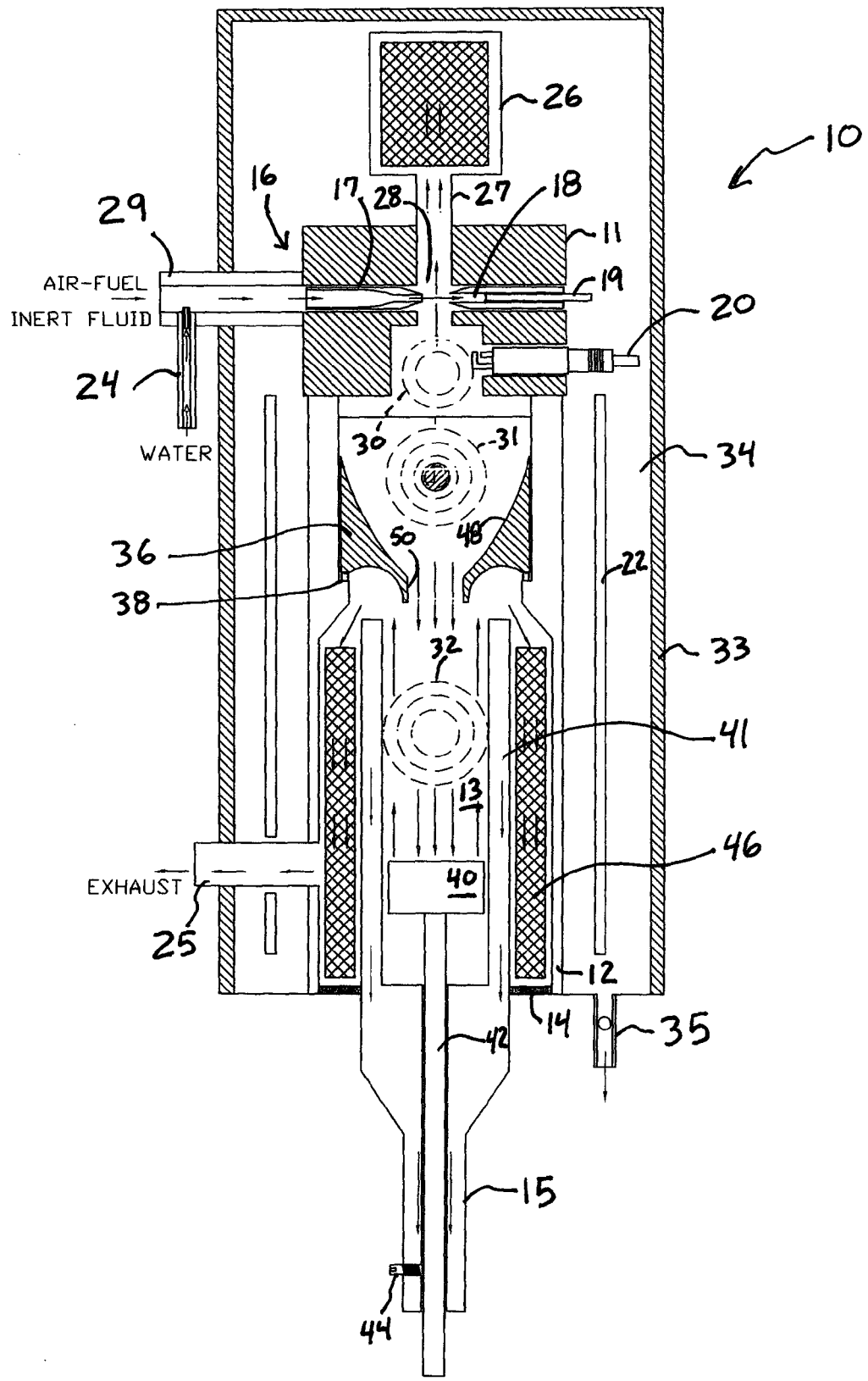

THERMO-ACOUSTIC REACTOR WITH NON-THERMAL ENERGY ABSORPTION IN INERT MEDIUM

FIELD OF THE INVENTION

The present invention relates in general to generating heat using hydrocarbons and water in a thermo-acoustic reactor and in particular to a method and device which uses an inert medium or fluid to absorb acoustic and electromagnetic energies from air-hydrocarbons exothermic reaction and convert into thermal energy. This efficiently transfers energy and may dissociate hydrocarbons and water producing cleaner combustion gases.

BACKGROUND OF THE INVENTION

Combustion devices are used in many applications to produce work and drive machinery. Many of these combustion engines produce dangerous gases, including carbon emissions. There have been many efforts to provide more efficient combustion of hydrocarbon fuels. One such effort is disclosed in U.S. Pat. No. 6,804,963 entitled "Thermoreactor with Linear to Rotation Motion Conversion" issuing to Constantin Tomoiu on Oct. 19, 2004, herein incorporated by reference. Therein disclosed are gas fuels injected into a resonance chamber, which generates ultrasound that works with a combustion chamber where the gas fuels are efficiently burned.

Another thermo-acoustic reactor device is disclosed in U.S. Pat. No. 8,752,665 entitled "Thermo-Acoustic Reactor with Molecular Disassociation" issuing to Constantin Tomoiu on Jun. 17, 2014, herein incorporated by reference.

While these thermoreactors provide efficient combustion of the gas fuels, there is a need for providing even more efficient combustion without any or reduced carbon emissions.

SUMMARY OF THE INVENTION

The present invention uses combustion reaction of hydrocarbons in a high frequency acoustic field as a source of acoustic and heat energy as electromagnetic energy to resonate an inert fluid increasing the thermal energy in the inert fluid causing its temperature to rise.

An air, fuel, and inert fluid, such as liquid water, mixture is injected under pressure through a convergent to straight inlet nozzle and accelerates the mixture to supersonic velocity or speed. The mixture then passes into a heated resonance chamber where it is exposed to high-frequency compressions and relaxations cause by acoustic waves generated by the process or micro-explosions. The high-frequency of the compressions and relaxations will create micro-cavities in the liquid water. When the micro-cavities collapse they generate and transfer thermal and acoustic energy to the surrounding atoms and molecules. This aids in mixing the air, fuel, and inert fluid or liquid water and may partially disassociate the water molecules.

When the pressure in the resonance chamber is greater than the incoming pressure from the inlet nozzle the air, fuel, and inert fluid mixture will overflow from the resonance chamber until the pressure in the resonance chamber and the incoming pressure from the inlet nozzle are equal, creating a micro-packet. The gases remaining in the resonance chamber expand to occupy the volume of the expelled micro-packet causing the pressure in the resonance chamber to decrease. As the pressure in the resonance chamber decreases the pressure from the inlet nozzle becomes greater than the pressure in the resonance chamber and a new micro-packet is formed and expelled from the resonance chamber into the combustion chamber. The mixture of the air, fuel, from micro-packets, are auto ignited to form micro-explosions generating thermal and acoustic energy as electromagnetic radiation with frequencies ranging from microwave, visible light, and inferred.

Acoustic energy and electromagnetic energy flow from the hotter combustion gases to the colder inert fluid or water during the micro-explosions. The combusted and reactive products and the inert fluid, such as water, flow from the combustion chamber through an adjustable volume combustion chamber nozzle into a larger central resonance chamber where stationary waves are generated. When the waves generated by the micro-explosions interfere with the waves in the central resonance chamber they are divided into two components.

A main component of the wave propagates through a mass in the central resonance chamber where incident waves generated by the micro-explosions interfere with waves reflected by the bottom of the central resonance chamber generating stationary waves. The difference in phase between incident waves generated by the micro-explosions and reflected waves is substantially zero. That is the waves are in phase and by interference produce an amplitude equal to the sum of the two individual waves; the reflected and incident waves. Inside the central resonance chamber combustion gases and the inert fluid are subjected to compression and relaxation with their resonance frequencies. Acoustic energy and electromagnetic energy from the hotter combustion gases are absorbed by the colder inert fluid and converted into thermal energy causing a rise in the temperature of the inert fluid. The low carbon emission detected in the exhaust gases suggest that disassociation and the formation of combustion products may take place.

When pressure increases in the central resonance chamber as a result of thermal expansion, gases overflow to be exhausted. A gradient temperature is created in the central resonance chamber and as a result thermal oscillations with a high acoustic level are generated. These thermal oscillations will transfer kinetic energy to the gases in the central resonance chamber and combustion chamber. As the pressure in the central resonance chamber decreases as a result of overflow, gases flow from the combustion chamber through a combustion chamber nozzle to replace the mass and volume of the expelled gases in the central resonance chamber forming stationary waves. This cycle continues. By absorbing the acoustic energy and the electromagnetic energy from the hotter combustion gases the colder inert fluid molecules and atoms increase their transitional, vibrational, and rotational kinetic energy causing the temperature to rise.

It is an object of the present invention to produce thermal energy efficiently and with substantially low carbon emissions.

It is an advantage of the present invention that a resonance is used to assist in the transfer of acoustic and electromagnetic energy from hotter combustion products to a colder inert fluid.

It is another advantage of the present invention that it uses an inert fluid or medium to harvest acoustic energy generated by micro-explosions and convert it to thermal energy.

It is a feature of the present invention that a resonance chamber is used to form micro-packets of air, fuel, and inert fluid and a standing wave and a central resonance chamber is placed in a combustion chamber.

It is another feature of the present invention that an adjustable combustion chamber nozzle is used in the combustion chamber to adjust the distance between the nozzle and the central resonance chamber.

It is another feature of the present invention that a nozzle having a converging portion and a straight portion is used.

These and other objects, advantages, and features will become readily apparent in view of the following more detailed description.

BRIEF DESCRIPTION OF THE DRAWING

The FIGURE schematically illustrates the present invention.

DETAILED DESCRIPTION OF THE PREFERRED EMBODIMENT

The FIGURE schematically illustrates the thermo-acoustic reactor 10 comprising head 11 and combustion chamber 12 according to the present invention. Placed within combustion chamber 12 is a central resonance chamber 13. The central resonance chamber 13 is welded at nodal point 14 to the bottom of combustion chamber 12. The nodal point is the point in a standing wave where the wave has substantially zero amplitude. The resonance chamber 13 has a smaller diameter or lateral dimension extension 15 which acts as an acoustic exhaust for the waves with frequencies other than the resonance frequencies filtered by the central resonance chamber 13. Within head 11 is placed a micro-packet and stationary wave generator 16. The micro-packet and stationary wave generator 16 comprises a nozzle 17 and resonance chamber 18. The distance between nozzle 17 and resonance chamber 18 can be adjusted. Piston 19 slides to adjust the depth of resonance chamber 18 and therefor the size and rate or number per second of micro-packets generated. On head 11 is mounted sparkplug 20. Around the combustion chamber 12 is an infrared reflecting jacket 22. Combustion chamber 12 has an exhaust port 25. The exhaust port 25 may be couple to a condenser and filter. A filter can remove any particulate matter from the water condensate. Acoustic damper chamber 26 is connected by the head 11 with the tube 27 and communicates with the combustion chamber 12 through port 28. A metal cloth having oxidation and corrosion resistance may be placed within the acoustic damper chamber 26. The metal cloth may be made of an austenite nickel-chromium-based superalloy, such as one sold under the trademark INCONEL. Housing 16 has an air-fuel inlet 29. Coupled to the air-fuel inlet 29 is an inert fluid or water inlet 24.

In the combustion chamber 12 there is an adjustable volume combustion chamber nozzle 36 that moves longitudinally within the combustion chamber 12 and is stopped by adjustable nozzle stop 38. The adjustable combustion nozzle 36 provides an upper portion variable or adjustable volume combustion chamber. The combustion chamber nozzle 36 has a converging portion 48 and a straight portion 50. Within the cylinder 41, forming the central resonance chamber 13, a movable piston 40 is reciprocally placed. The piston 40 is connected to a connecting rod 42. The connecting rod 42 may be fixed into position by set screw 44. A metal cloth 46 having oxidation and corrosion resistance may be placed around the cylinder 41. The metal cloth 46 may be made of an austenite nickel-chromium based superalloy, such as one sold under the trademark INCONEL.

Referring to the FIGURE, in operation air and gaseous fuels flow through port 29 as liquid water flows through port 24 and pass into nozzle 17 and into resonance chamber 18 formed in part by piston 19. The nozzle 17 has a converging section of decreasing diameter and a straight section of constant diameter. Micro-packets 30 of air-fuel-water mixture are generated or formed. The air and fuel of the mixture forming the micro-packets 30 are ignited by sparkplug 20 to generate micro-explosions 31. The micro-explosions 31 will transfer thermal and acoustic energy to the mass of water contained within the micro-packets 30 transferring energy to the water and transport mass as heat and acoustic energy into central resonance chamber 13 where stationary waves are generated. When the waves generated by micro-explosion 31 interfere with the central resonance chamber 13 the waves are divided in two components.

The main component propagates through the mass 32 in the central resonance chamber 13 where incident waves or incoming waves generated by the micro-explosions 31 will interfere with the wave reflected by the flat surface of piston 40, generating or forming stationary waves. The difference in phase between incident and reflected waves are near zero or zero, that is the waves are in phase and by interference produce an amplitude equal to the sum of the individual amplitudes of the two waves, reflected and incident wave, which interfere.

As a result, the mass, including combustion gases and water, in the central resonance chamber 13 are resonated and energy is transferred to the water or inert fluid. As a result the mass 32 in the resonance chamber 13 increases its thermal and acoustic energy as pressure, and will be expelled from chamber 13 and transfers energy to the mass in the reactor. When mass 32 is expelled from resonance chamber 13 a temperature gradient forms resulting in the generation of thermal oscillations that have a high acoustic level. The reacted, byproduct, or combustion gases are exhausted through port 25 and a small volume of the combustion gases are compressed at the bottom of combustion chamber 12 and then exhausted through port 25. This will create a quick thermal expansion which has the effect of cooling the bottom of chamber 12. The exhaust or smaller diameter extension 15 will exhaust or remove the waves with frequencies other than resonance frequencies of mass 32 which are filtered out by resonance chamber 13.

Acoustic damper chamber 26 works as an acoustic shock absorber which absorbs heat and acoustic energy and releases the energy when needed or desired. Infrared reflecting jacket 22 is wrapped around the combustion chamber 12 to block infrared radiation and reflect the infrared radiation back to the combustion chamber 12. The thermo-acoustic reactor 10 is encapsulated in a thermal insulating vacuum chamber 33. A vacuum is created within vacuum chamber 33 through vacuum valve 35.

Testing of a prototype of the thermos-acoustic reactor showed that by adding an inert fluid, such as liquid water, helium, nitrogen, carbon dioxide, or cooled combustion gases to the combustion in a high frequency sound field created two different physical systems. The first being a hot body formed by the hot combustion gases and the second being a cold body formed by the cold inert fluid. The two different physical systems will reach thermal equilibrium at a temperature near the initial temperature of the hot body, with no significant thermal energy transferred from the hot body to the cold body. Acoustic energy and electromagnetic energy, instead of thermal or heat energy, is absorbed by the cold body from the hot body. Acoustic energy represents greater than ninety percent of the energies absorbed by the inert fluid or medium.

A second incident wave component is generated by the micro-explosions in a collision of front acoustic waves with the circular inner surface of the central resonance chamber. The metal mass of the central resonance chamber transports acoustic waves with high velocity, about 5000 m/s, through the walls in the form of longitudinal and transverse waves. The waves induce vibrations in the molecules adjacent to chamber walls, and the residual waves are exhausted through a smaller diameter extension that acts as an acoustic exhaust. Additionally, the metal wall of the resonance chamber filters out, through the acoustic exhaust all frequencies other than the natural frequencies of vibration of the mass inside the resonance chamber.

Preferably liquid water will be used as the inert fluid. However, to prove the concept of transferring acoustic and electromagnetic energy from hot combustion products to cold inert fluid, helium was used in the test with a prototype device. In the test, when the prototype thermo-acoustic reactor reached the working temperature of 1148° C. helium was introduced at room temperature of 25° C. to form a micro-packet of air, fuel, and helium. Helium as an inert gas takes no direct part in exothermic reactions of the air and fuel mixture. Helium, a monatomic gas, has atoms that only have translational motion. By absorbing acoustic and electromagnetic energy generated by the micro-explosions of air and fuel mixture of micro-packets, the helium increases its translational kinetic energy and therefore its thermal energy causing its temperature to rise. The helium acts as an absorber that absorbs, converts, and stores acoustic and electromagnetic energy into thermal energy.

In testing it was indicated that complete combustion of propane produces carbon dioxide ($CO_2$) and water ($H_2O$). The test without adding water or helium provided the following combustion products.

| Input | Kg/h | Exit | Kg/h |
|---|---|---|---|
| Propane | 0.118 | $CO_2$ | 0.354 |
| Air | 2.724 | $H_2O$ | 0.193 |
|  |  | $N_2$ | 2.056 |
|  |  | $O_2$ | 0.668 |

The following provides the total heat of combustion.

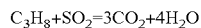

$C_3H_8 + 5O_2 = 3CO_2 + 4H_2O$

Standard heat of combustion: 2,021 KJ/mole
Inlet flow: 2.68 mole/hr
Total heat of combustion: 5.416 MJ The energy per hour needed to raise the combustion products to 1,148° C. is provided below.

Cp in KJ/Kg-K 1,148° C. (1,421.5° K)
$CO_2$ 1.318
$H_2O$ 2.577
$N_2$ 1.235
$O_2$ 1.236

The Enthalpy of the reaction products (H) is given below.

$H = (Cp) \times (mass) \times (\Delta T)$ (1,148° C.−25° C.=1,123° C. (1,396.5° K)

$H$ (for $CO_2$)=(1.318 KJ/Kg-K)×(0.354 Kg)×(1,123° C.)=0.524 MJ/h $H$ (for $H_2O$)=(2.577 KJ/Kg-K)×(0.193 Kg)×(1,123° C.)=0.558MJ/h $H$ (for $N_2$)=(1.235 KJ/Kg)×(2.056 Kg)×(1,123° C.)=2.851MJ/h $H$ (for $O_2$)=(1.236 KJ/Kg)×(0.668 KG)×(1,123° C.)=0.927 MJ/h TOTAL=4.86 MJ/h Accordingly, the loss to the surroundings is:

5.416 MJ/h−4.86 MJ/h=0.556 MJ/h

The following tests were performed.

| Test Number | Air Kg/h | Propane Kg/h | Inert fluid Kg/h | Inert/Fuel ratio | Reactor C. | Exhaust C. | Specific heat KJ/Kg K | Energy require to reach thermal equilibrium from 25° C. |
|---|---|---|---|---|---|---|---|---|
| 1 | 2.724 | 0.118 | 0 | — | 1148 | 851 | — | REACTOR ENERGY 4.86 MJ/h |
| 2 | 2.724 | 0.118 | Water 0.675 | 6.2/1 | 1059 | 903 | 4.184 | 4.442 MJ/h |
| 3 | 2.724 | 0.118 | Helium 1.020 | 8.64/1 | 1039 | 1027 | 5.19 | 5.236 MJ/h* |
| 4 | 2.724 | 0.118 | $CO_2$ 1.350 | 11.44/1 | 1120 | 960 | 0.844 | 1.247 MJ/h |
| 5 | 2.724 | 0.118 | $N_2$ 1.380 | 11.69/1 | 920 | 905 | 1.04 | 1.284 MJ/h |

Where, in Test Number 2
Input: water 0.675 Kg/h at 25° C.
 Cm (specific heat capacity): 4.181 KJ/Kg K
 (L) (latent Heat of vaporization): 2260 KJ/Kg K
Thermal energy draws from combusted gases by adding 0.675 Kg/h water:
 Reactor temperature before adding water: 1148° C. (by combusting 0.118 Kg/h C3H8).
 Enthalpy of combusted products: 4.86 MJ/h
 Thermal equilibrium with 0.675 Kg/h water added is reached at 1059° C.
 Temperature drops: 1148° C.−1059*C=89° C.

$H$ (transferred)=(4.181 KJ/h K)×(0.675 Kg/h)×(89° C.)=251 KJ/h.

Reactor thermal energy at 1059° C. (only combusted gases):

4.86 MJ/h−0.251 MJ/h=4.609 MJ/h.

WATER thermal energy at 1059° C.:

$H: (Cm) \times (m) \times (\Delta T1)$ $\Delta T1$=100° C.−25° C.=75° C.

$H1$: (4.181 KJ/Kg K)×(0.675 Kg/h)×(75°C)=0.211 MJ/h $H2$: (L)×(m)=(2260 KJ/Kg)×(0.675 Kg/h)=1.525 MJ/h $H3$: (4.181 KJ/Kg K)×(0.675 Kg/h)×(959° C.)=2.706 MJ/h (Q1)+(Q2)+(Q3)=4.442 MJ/h

Acoustic energy and other form of energies (non thermal) absorbed from hot body by 0.675 Kg/h water at 1059° C.:

4.442 MJ/h−0.251 MJ/h=4.191 MJ/h

REACTOR thermal energy/hour at thermal equilibrium of 1059*C (water+hot combusted gases)
  Mass/hour in reactor at 1059° C.:
  combusted gases: 2.842 Kg/h
  water: 0.675 Kg/h
    TOTAL mass/h: 2.842 Kg/h+0.675 Kg/h=3.517 Kg/h
    TOTAL energy/h of 3.517 Kg/h at 1059° C.:

4.442 MJ/h+4.609 MJ/h=9.051 MJ/h

Helium (He)
  Standard atomic weight: 4.002602
  Electron configuration: 1s2
  Ionization energies 1st: 2,372.3 KJ/mole
  2nd: 5,250.5 KJ/mole
  Molar heat capacity $C_m$=20.786 J/mole K (5.1965 KJ/Kg K)
  Density: 0.786 g/L (0° C.; 101.325 KPa)
  Thermal conductivity: 0.1513 W/m K (watts per meter kelvin)
  Speed of sound: 972 m/s (meters per second)
REACTOR Input:
  Air: 2.724 Kg/h; Propane: 0.118 Kg/h. Air/Fuel ratio: 23/1
  Reactor temperature: 1148° C.
  Enthalpy of reaction products: 4.86 MJ/h.
  HELIUM: 1.020 Kg/h at 25° C. industrial grade is injected at same (Air-Fuel) inlet port.
  Only 0.971 Kg/h of Helium is considered, as industrial grade (95.2% concentration) was used for the test.
  Reactor temperature drops to 1039*C when a thermal equilibrium was reached.
"Thermal Energy" transferred from hot body (combustion gases) to cold body (Helium at 25*C):

$H$=($C_m$)×(mass)×($\Delta T$)

$H$ (transferred)=(5.19 KJ/Kg K)×(0.971 Kg/h)×(109° C.)=0.549 MJ/h

"thermal Energy" of hot body at thermal equilibrium at 1039° C.:

$H$=4.86 Mj/h−0.549 MJ/h=4.311 MJ/h

"Thermal Energy" of 0.971 Kg/h Helium at 1039° C.

$\Delta T$=1039° C.−25° C.=1014° C.

$H$ (helium)=(5.19 KJ/Kg K)×(0.971 Kg/h)×(1,014° C.)=5.110 MJ/h

"Acoustic Energy" as other form of energies (non thermal) absorbed from hatter body by 0.971 Kg/h HELIUM:

5.110 MJ/h−0.549 MJ/h=4.561 MJ/h

Reactor "total Thermal Energy" (hot combustion gases+Helium) at 1014*C thermal equilibrium:

$H$ (reactor)=4.311 MJ/h+5.110 MJ/h=9.421 MJ/h

Helium can't be ionized by the process and takes no direct part in the air and fuel exothermic reaction.

The present provides a method of generating acoustic and electromagnetic energy from an exothermic reaction by injecting an air, fuel, and inert fluid mixture into a resonance chamber, generating cavitation bubbles in the inert fluid in the resonance chamber, and forming micro-packets of the air, fuel, and inert fluid mixture forming a cold body. Upon igniting the air and fuel in the micro-packets combustion gases are generated and thermal and acoustic energy. A hot body is formed by the combustion gases. The inert fluid is compressing and relaxing. The combustion gases are expelling through a nozzle to a central resonance chamber generating a standing wave and thermal oscillation within the central resonance chamber. As a result, atoms and molecules of the combustion gases and inert fluid are exposed to compression and relaxation and acoustic energy rather than thermal energy is transferred from the hot body to the cold body increasing the temperature of the cold body and thermal equilibrium of the hot and cold body is reached by conversion of acoustic energy to thermal energy without a substantial drop in temperature of the hot body.

The present invention uses a resonance chamber to generate micro-packets of fuel that are exploded with the resulting energy directed to a central resonance chamber having a flat bottom creating standing waves resulting in a resonance of the mass in the central resonance chamber. This aids in transferring acoustic and electromagnetic energy to an inert fluid, such as water. Accordingly, the present invention may be utilized in many conventional devices, such as a steam engine or turbine, to produce useful work from the heat generated. This work can be performed with very few harmful emissions. The present invention may also be used in heating systems in buildings or to produce hot water.

While the present invention has been described with respect to several different embodiments, it will be obvious that various modifications may be made without departing from the spirit and scope of this invention.

What is claimed is:

1. A thermo-acoustic reactor comprising:
   a micro-packet and stationary wave generator coupled having an input nozzle providing air, fuel, and an inert fluid and a resonance chamber;
   a passage formed in said micro-packet and stationary wave generator between the input nozzle and the resonance chamber;
   a spark plug adjacent said passage;
   a combustion chamber adjacent said spark plug;
   an adjustable combustion nozzle placed adjacent said combustion chamber, said adjustable combustion nozzle having a convergent portion and a straight portion; and
   a central resonance chamber placed adjacent said adjustable combustion nozzle within said combustion chamber having a bottom,
   whereby the input nozzle introduces the air, fuel and inert fluid into said micro-packet and stationary wave generator forming micro-packets and micro-explosions in the combustion chamber forming pressure and acoustic waves transferred to the inert fluid.

2. A thermo-acoustic reactor as in claim 1 further comprising:
   a piston placed within the resonance chamber of said micro-packet and stationary wave generator.

3. A thermo-acoustic reactor as in claim 1 further comprising:
an acoustic damper chamber coupled to said micro-packet and stationary wave generator.

4. A thermo-acoustic reactor as in claim 1 wherein:
the inert fluid is water.

5. A thermo-acoustic reactor comprising:
a convergent to straight nozzle providing air-fuel and water;
a micro-packet and stationary wave generator coupled to said convergent to straight nozzle;
wherein said micro-packet and stationary wave generator generates an air-fuel and water micro-packet;
wherein said micro-packet and stationary wave generator comprises a housing receiving acoustic waves from micro-explosions;
wherein said micro-packet and stationary wave generator comprises a resonance chamber generating stationary waves;
wherein said micro-packet and stationary wave generator and the resonance chamber are heated by heat transfer from the micro-explosions of the micro-packet of air-fuel-water mixture;
a combustion chamber having a bottom;
an adjustable combustion chamber convergent to straight nozzle placed in said combustion chamber opposing the bottom;
a spark plug coupled to said combustion chamber;
wherein the air-fuel in the micro-packet is ignited by said sparkplug causing the micro-explosion and generating acoustic waves in the combustion chamber;
a central resonance chamber placed in said combustion chamber forming a nodal point at a bottom of said central resonance chamber;
wherein said central resonance chamber generates stationary waves and water molecules and combustion molecules are resonated;
wherein said central resonance chamber has a gradient temperature and thermal oscillations are generated;
a smaller diameter extension attached to one end of said central resonance chamber to balance the resonance chamber and to exhaust waves filtered by said central resonance chamber;
an infrared jacket wrapped around said combustion chamber, whereby infrared radiation is blocked;
a vacuum chamber placed around the thermo-acoustic reactor, whereby the transfer of acoustic and thermal energy is blocked; and
an exhaust port placed at a distance from the bottom of said combustion chamber.

6. A method of generating thermo-acoustic energy comprising the steps of:
injecting an air, fuel, and liquid water mixture into a resonance chamber;
expelling micro-packets of the air, fuel, and liquid water mixture from the resonance chamber;
exploding the micro-packets of air, fuel, and liquid water mixture in an adjustable volume portion of a combustion chamber generating heat and acoustic energy; and
receiving the heat and acoustic energy in a central resonance chamber wherein standing waves are formed, whereby acoustic and electromagnetic energy is transferred to the water increasing its temperature.

7. A method of generating acoustic and electromagnetic energy from an exothermic reaction comprising the steps of:
injecting an air, fuel, and inert fluid mixture into a resonance chamber;
generating cavitation bubbles in the inert fluid in the resonance chamber,
forming micro-packets of the air, fuel, and inert fluid mixture forming a cold body;
igniting the air and fuel in the micro-packets generating combustion gases and thermal and acoustic energy, whereby a hot body is formed by the combustion gases;
compressing and relaxing the inert fluid;
expelling the combustion gases through a nozzle to a central resonance chamber; and
generating a standing wave and thermal oscillation within the central resonance chamber,
whereby atoms and molecules of the combustion gases and inert fluid are exposed to compression and relaxation and acoustic energy rather than thermal energy is transferred from the hot body to the cold body increasing the temperature of the cold body and thermal equilibrium of the hot and cold body is reached by conversion of acoustic energy to thermal energy without a substantial drop in temperature of the hot body.

8. A method of generating acoustic and electromagnetic energy from an exothermic reaction as in claim 7 wherein:
the inert fluid is liquid water.

9. A method of generating acoustic and electromagnetic energy from an exothermic reaction as in claim 7 wherein the step of generating cavitation bubbles comprises the steps of:
compressing and relaxing the air, fuel, and liquid water mixture with micro-explosions.

10. A method of generating acoustic and electromagnetic energy from an exothermic reaction as in claim 7 wherein the step of forming micro-packets comprises the steps of:
increasing pressure in the resonance chamber by acoustic and thermal energy transfer;
overflowing a volume of air, fuel, and liquid water mixture form the resonance chamber expelling the micro-packet; and
refilling the resonance chamber with the air, fuel, and liquid water mixture,
whereby micro-packets are formed.

* * * * *